United States Patent
Carroll et al.

(10) Patent No.: US 9,939,913 B2
(45) Date of Patent: Apr. 10, 2018

(54) SMART HOME CONTROL USING MODULAR SENSING DEVICE

(71) Applicant: Sphero, Inc., Boulder, CO (US)

(72) Inventors: Jonathan Carroll, Boulder, CO (US); Paul Berberian, Boulder, CO (US)

(73) Assignee: Sphero, Inc., Boulder, CO (US)

( * ) Notice: Subject to any disclaimer, the term of this patent is extended or adjusted under 35 U.S.C. 154(b) by 0 days.

(21) Appl. No.: 15/253,790

(22) Filed: Aug. 31, 2016

(65) Prior Publication Data

US 2017/0193813 A1  Jul. 6, 2017

Related U.S. Application Data

(60) Provisional application No. 62/274,514, filed on Jan. 4, 2016, provisional application No. 62/346,216, filed on Jun. 6, 2016.

(51) Int. Cl.
G05B 11/01 (2006.01)
G06F 3/01 (2006.01)
(Continued)

(52) U.S. Cl.
CPC ............ *G06F 3/017* (2013.01); *A63F 13/21* (2014.09); *A63F 13/211* (2014.09); *A63F 13/235* (2014.09); *A63F 13/28* (2014.09); *A63F 13/32* (2014.09); *A63H 17/26* (2013.01); *A63H 23/04* (2013.01); *A63H 27/00* (2013.01); *A63H 27/12* (2013.01); *A63H 30/04* (2013.01);
(Continued)

(58) Field of Classification Search
None
See application file for complete search history.

(56) References Cited

U.S. PATENT DOCUMENTS 9,599,992 B2  3/2017  Kohstall
9,663,227 B1  5/2017  Lema
(Continued)

FOREIGN PATENT DOCUMENTS

EP   2876907       5/2015
KR   10-2012-0006160   1/2012
(Continued)

OTHER PUBLICATIONS

U.S. Appl. No. 15/253,799, Office Action dated Jun. 29, 2017, 15 pages.
(Continued)

*Primary Examiner* — Adolf Dsouza
(74) *Attorney, Agent, or Firm* — Merchant & Gould P.C.

(57) ABSTRACT

A modular sensing device and method of operating a smart home device includes initiating a control mode from a plurality of modes on the modular sensing device, where the control mode determines a manner in which user gestures are interpreted. Based on initiating the control mode, a connection with the smart home device can be established. Furthermore, the modular sensing device and method can further include receiving sensor data corresponding to the user gestures, translating the sensor data into a corresponding control command, and transmitting the control command to the smart home device. The corresponding control command can be executable to control the smart home device in accordance with the user gesture.

20 Claims, 12 Drawing Sheets

(51) Int. Cl.

| | |
|---|---|
| G08B 7/06 | (2006.01) |
| A63F 13/21 | (2014.01) |
| A63F 13/28 | (2014.01) |
| A63F 13/32 | (2014.01) |
| A63H 17/26 | (2006.01) |
| A63H 23/04 | (2006.01) |
| A63H 27/00 | (2006.01) |
| A63H 30/04 | (2006.01) |
| A63H 33/00 | (2006.01) |
| G05D 1/00 | (2006.01) |
| G06F 1/16 | (2006.01) |
| G06F 3/0346 | (2013.01) |
| G06F 3/0485 | (2013.01) |
| G06F 3/16 | (2006.01) |
| A63F 13/211 | (2014.01) |
| A63F 13/235 | (2014.01) |
| G06F 3/02 | (2006.01) |
| G06F 3/038 | (2013.01) |
| G08C 17/02 | (2006.01) |
| H04W 4/00 | (2018.01) |
| H04W 8/00 | (2009.01) |
| G06F 3/0488 | (2013.01) |
| H04W 84/18 | (2009.01) |
| H04L 12/28 | (2006.01) |

(52) U.S. Cl.
CPC ......... *A63H 33/005* (2013.01); *G05D 1/0016* (2013.01); *G06F 1/163* (2013.01); *G06F 3/016* (2013.01); *G06F 3/02* (2013.01); *G06F 3/038* (2013.01); *G06F 3/0346* (2013.01); *G06F 3/0485* (2013.01); *G06F 3/167* (2013.01); *G08B 7/06* (2013.01); *G08C 17/02* (2013.01); *H04W 4/008* (2013.01); *H04W 8/005* (2013.01); *A63F 2300/405* (2013.01); *A63F 2300/8082* (2013.01); *G06F 3/04883* (2013.01); *G08C 2201/32* (2013.01); *G08C 2201/92* (2013.01); *H04L 12/2803* (2013.01); *H04W 84/18* (2013.01)

(56) References Cited

U.S. PATENT DOCUMENTS

| | | |
|---|---|---|
| 2009/0222149 A1 | 9/2009 | Murray |
| 2010/0124949 A1 | 5/2010 | Demuynck et al. |
| 2011/0090407 A1 | 4/2011 | Lee |
| 2011/0159939 A1 | 6/2011 | Lin et al. |
| 2011/0205156 A1 | 8/2011 | Gomez et al. |
| 2012/0168241 A1 | 7/2012 | Bernstein et al. |
| 2012/0242481 A1 | 9/2012 | Gernandt et al. |
| 2014/0008496 A1 | 1/2014 | Zhou et al. |
| 2014/0020964 A1 | 1/2014 | Bernstein et al. |
| 2014/0143784 A1 | 5/2014 | Mistry et al. |
| 2014/0347265 A1 | 11/2014 | Aimone et al. |
| 2014/0371906 A1 | 12/2014 | Barajas |
| 2015/0026647 A1 | 1/2015 | Park et al. |
| 2015/0054630 A1 | 2/2015 | Xu et al. |
| 2015/0062086 A1 | 3/2015 | Nattukallingal |
| 2015/0077336 A1 | 3/2015 | Elangovan |
| 2015/0304785 A1 | 10/2015 | Gan et al. |
| 2015/0338925 A1* | 11/2015 | Bernstein ................ G06F 3/017 345/156 |
| 2016/0299572 A1* | 10/2016 | Grover .................... G06F 3/017 |
| 2016/0313742 A1 | 10/2016 | Wang |
| 2017/0031446 A1 | 2/2017 | Clark |
| 2017/0064181 A1 | 3/2017 | Zhang |
| 2017/0147077 A1* | 5/2017 | Park ........................ G06F 1/163 |
| 2017/0180537 A1* | 6/2017 | Heo ...................... H04M 1/7253 |
| 2017/0189803 A1 | 7/2017 | Atwell et al. |
| 2017/0189824 A1 | 7/2017 | Godby et al. |
| 2017/0192516 A1 | 7/2017 | Godby et al. |
| 2017/0192517 A1 | 7/2017 | Hygh et al. |
| 2017/0192518 A1 | 7/2017 | Hygh et al. |

FOREIGN PATENT DOCUMENTS

| | | |
|---|---|---|
| KR | 10-2015-0063998 | 6/2015 |
| WO | 2015060856 | 4/2015 |
| WO | 2015094220 | 6/2015 |
| WO | 2015102467 | 7/2015 |

OTHER PUBLICATIONS

PCT International Search Report and Written Opinion in PCT/US2017/020762, dated May 24, 2017, 16 pages.
PCT International Search Report and Written Opinion in PCT/US2017/020771, dated Jul. 12, 2017, 17 pages.
PCT International Search Report and Written Opinion in PCT/US2017/020775, dated May 24, 2017, 14 pages.
PCT International Search Report and Written Opinion in PCT/US2017/020779, dated May 24, 2017, 14 pages.
PCT International Search Report and Written Opinion in PCT/US2017/020786, dated May 24, 2017, 15 pages.
PCT International Search Report and Written Opinion in PCT/US2017/020790, dated Sep. 6, 2017, 15 pages.
U.S. Appl. No. 15/253,799, Amendment and Response filed Nov. 29, 2017, 12 pages.
U.S. Appl. No. 15/253,778, Office Action dated Jan. 12, 2018, 6 pages.

* cited by examiner

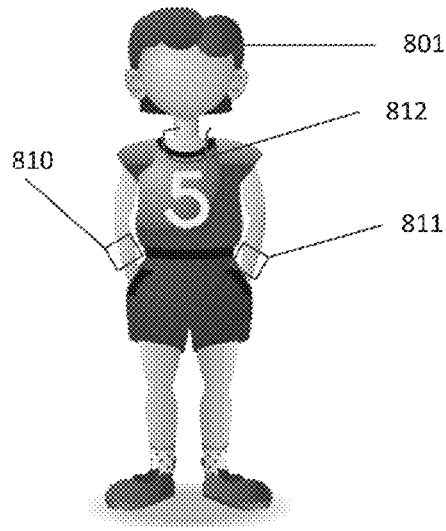
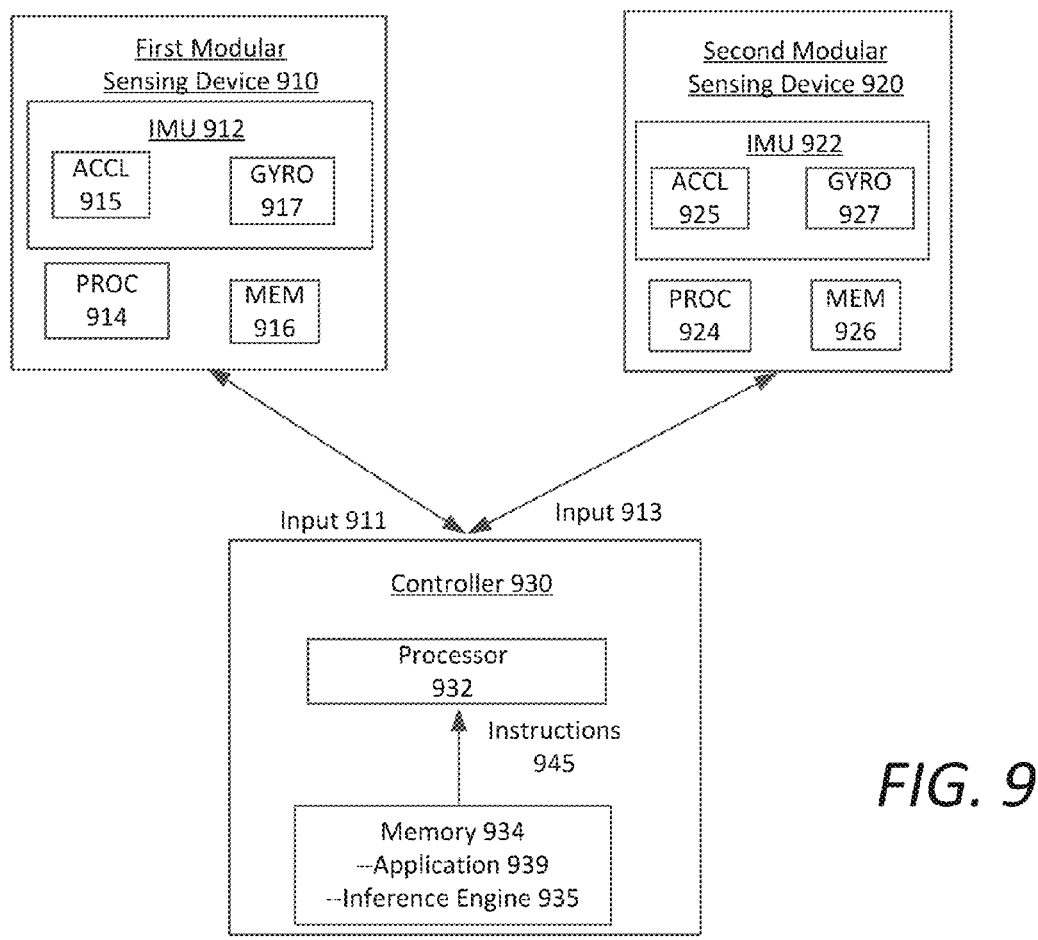
FIG. 8
FIG. 9

SMART HOME CONTROL USING MODULAR SENSING DEVICE

CROSS REFERENCE TO RELATED APPLICATIONS

This application claims the benefit of priority to U.S. Provisional Patent Application Ser. No. 62/274,514, entitled "PORTABLE SENSING DEVICE FOR PROCESSING GESTURES AS INPUT," and filed on Jan. 4, 2016; and U.S. Provisional Application Ser. No. 62/346,216, entitled "MODULAR SENSING DEVICE FOR PROCESSING GESTURES AS INPUT," and filed on Jun. 6, 2016; the aforementioned priority applications being hereby incorporated by reference in their respective entireties.

BACKGROUND

Remotely operated self-propelled devices are typically operable by way of analog or digital controller devices that communicate a limited amount of preconfigured commands. Such commands typically involve signaled radio frequency communications to accelerate and maneuver the self-propelled device. Furthermore, wearable device technology in consumer electronics is rapidly being integrated into routine user activities, such as sporting activities, content viewing or browsing, and task-oriented activities (e.g., gaming).

Furthermore, wireless networks typically utilize protocols that enable wireless devices to detect signal sources from other devices for initiating data and communication links. Such networks are typically implemented using networking hardware, which may be incorporated in various wireless network devices, such as access points (APs), peer-to-peer (P2P) devices, wireless local area network (LAN) equipped devices, and the like—each advertising a unique identity (e.g., a media access control (MAC) address) indiscriminately to devices within range. Connections may be established with such devices to transmit and receive data.

BRIEF DESCRIPTION OF THE DRAWINGS

The disclosure herein is illustrated by way of example, and not by way of limitation, in the figures of the accompanying drawings in which like reference numerals refer to similar elements, and in which:

FIG. 8 illustrates an embodiment of multiple sensing devices that concurrently provide input for a program or application which utilizes the inputs, along with inferences which can be made about a person or object that carries the devices, according to one or more examples;

FIG. 9 illustrates a system which concurrently utilizes input from multiple modular sensing devices in connection with execution of an application or program;

DETAILED DESCRIPTION

Figure 1A:
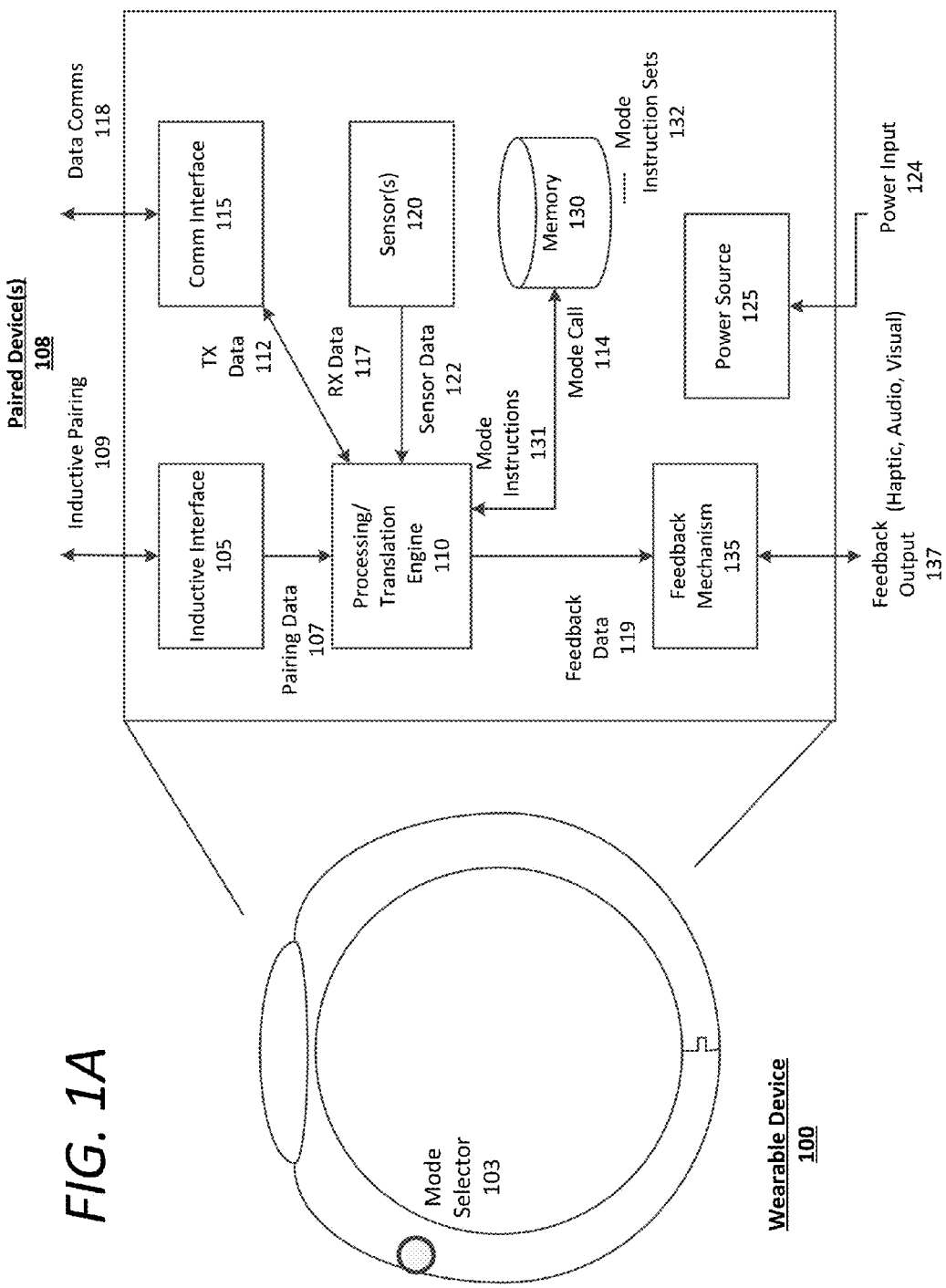
FIG. 1A is a block diagram illustrating an example wearable device utilizing a modular sensing device, as described herein.

Examples described herein relate to a multi-modal modular sensing device, worn or carried by a user (e.g., as a wrist-worn device), to enable a variety of interactions with other devices through sense movement of the modular sensing device. Among other activities, examples provide for a modular sensing device that can individually, or in combination with another device (e.g., controller device, such as a mobile computing device) control other devices, interact with compatible devices of other users, and/or operate in connection with task-oriented activities (e.g., gameplay). In some examples, the modular sensing device corresponds to a wearable (e.g., a watch, a pendant for necklace, a hat, glasses) can be placed in a mode to control the characteristics of movement of another device. For example, the modular sensing device can control acceleration and maneuvering of a self-propelled device.

In certain aspects, a wearable device can be operated in connection with a separate mobile computing device that can execute a designated application in order to enable the wearable device to operate in a specified mode. According to some examples, the mobile computing device can be utilized to connect an example wearable device to any a smart home device, a self-propelled device, and/or one or more additional wearable devices for purpose of enabling the user to interact with, control, and/or operate such connected devices via user gestures (e.g., user gestures such as arm gestures) that can be sensed through the wearable device. Still further, in variations and other applications are implementations where a wearable device can be operable to detect and acquire virtual resources to be utilized by the user in a virtual or network-based environment (e.g., an online gameplay environment).

According to some examples, a modular sensing device is operable to detect its own movement in three-dimensional space, using an inertial measurement unit (IMU). In some implementations, the IMU can be an integrated device. Alternatively, the IMU can be implemented through a combination of sensors, such as a three-dimensional accelerometer or gyroscope. In some examples, the modular sensing device can include a processor and memory to interpret the sensor data, and to communicate interpreted sensor data to another device (e.g., mobile computing device) using a wireless connection (e.g., BLUETOOTH). In variations, the IMU can generate raw sensor data based on the user gestures, which can be processed, based on the processing resources of the modular sensing device, and the processing load which is implemented for the modular sensing device.

As used herein, "a portable sensing device" or "a modular sensing device" can include any electronic device that includes sensor resources for detecting its own movement, and of dimension and form factor suitable for being carried with one hand or worn on a human body. Numerous examples of modular sensing devices are provided in the context of a "wearable device," such as a wrist worn device (e.g., watch, watch band, bracelet). But as noted by other examples, variations to the type and form factor of a wearable device can vary significantly, encompassing, for example, eyeglasses, hats, pendants, armbands, glasses and various other form factors. While many examples described functionality in the context of a wearable device, embodiments extend such examples to other forms of modular sensing devices, such as wands, fobs, or mobile communication devices.

In many examples, the wearable device can include one or more sensors to detect the device's own movements. In particular, a wearable device can include an accelerometer and/or a gyroscopic sensor. In some examples, sensor data, corresponding to gestures performed by the user wearing the wearable device, can be translated into control commands or data packets to be transmitted and implemented based on the selected mode of the wearable device. According to many examples, the wearable device can include an inductive interface to inductively pair with other devices, which can trigger a specified mode on the wearable device. For example, an inductive pairing between the wearable device and a self-propelled device can trigger a drive mode in which the wearable device can be utilized by the user to operate the self-propelled device. Additionally or alternatively, the wearable device can include an input mechanism, such as an analog or digital button, that enables the user to select a particular mode and/or scroll through a series of modes for the wearable device.

Among other functionality, some examples described herein provide for alternative modes of operation, including, for example (i) a "drive mode" in which the wearable device is utilized to control a self-propelled device; (ii) a "control mode" in which the wearable device is utilized in connection with smart home devices; (iii) a "finding mode" or "finder mode" in which the wearable device is utilized to detect virtual or digital resources; (iv) a "mining mode" which can be initiated by the user to collect virtual resources when they are detected in the finder mode; (v) a "training mode" in which the wearable device is utilized in connection with a self-propelled device to assist the user in training for certain achievements or for increasing the user's abilities to perform task-oriented activities (e.g., increasing skills for a subsequent game or sporting activity); (vi) a "sword mode" in which the wearable device provides feedback (e.g., haptic, audio, and/or visual feedback) when the user performs actions while holding an object; (vii) a "default mode" in which the device monitors for and detects other proximate wearable devices (e.g., wearable devices of the same type) which enables the users to pair with each other's wearable devices; (viii) a "interactive mode" or "battle mode" selectable in response to two or more device pairings in which users are able to interact with each other with predetermined sets of actions (e.g., offensive and defensive actions learned and perfected by users practicing in the training mode); (ix) a "sharing mode" selectable in response to two or more device pairings in which users can share information stored in each other's wearable devices, or user accounts associated with the wearable devices (e.g., sharing collected virtual resources discovered and mined in the finder and mining modes to be expended or consumed in a gameplay environment); and (x) a "gaming mode" in which the wearable device can be utilized in connection with a game.

Still further, numerous examples make reference to a "self-propelled" device. A self-propelled device can include, for example, a device that can be wirelessly and remotely controlled in its movement, whether the movement is on ground, water or air. For example, a self-propelled device can include a wirelessly and remotely controlled drone, car, plane, helicopter, boat, etc. While conventional examples enable control of a self-propelled device, conventional approaches generally utilize a perspective of the device being controlled. While some conventional devices, for example, enable a computing device held by the user to project a perspective of the device under control, examples described herein enable control of such devices to utilize an orientation of the user. Specifically, some examples include a modular sensing device that can determine an orientation of the user, and further enable control of the self-propelled device through an environment that accommodates or is in the perspective of the user, based on the orientation of the user (as determined by the modular sensing device). By way of example, the control of a self-propelled device can be projected through an orientation or perspective of the user for purpose of a virtual environment.

Some examples include a wearable device having a wireless communication module (e.g., a BLUETOOTH low energy module) that enables communication of sensor data (e.g., raw sensor data from the accelerometer or gyroscopic sensor), or translated data (i.e., translations of the sensor data based on the selected mode of the wearable device). In some examples, the sensor data may be relayed for translation by a mobile computing device before being transmitted to another device (e.g., a paired wearable device or a paired self-propelled device). In other examples, processing resources of the wearable device can execute mode instructions, based on the selected mode, to translate the sensor data for direct transmission to one or more other devices, as described herein.

As used herein, "body part gestures" or "user gestures" include gestures performed by a user while utilizing the wearable device. For example, the wearable device may be a wrist-worn device, in which case the body part or user gestures may comprise arm gesture, and can include any number of physical movements or actions that affect the sensors of the wearable device when it is worn on the wrist. Such movements and actions can include shaking, arm movements (e.g., raising, lowering, pointing, twisting, and any combination thereof), wrist movements, hand actions (such as grasping or grabbing), and the like. However, the wearable device is not limited to wrist-worn devices, but may be utilized as a ring (e.g., a finger-worn device), an ankle-worn device, a neck-worn device, a head-worn device, a belt (e.g., a waist-worn device), etc. Thus, user gestures performed using the wearable device can be any actions or movements in which correlated sensor data from sensors of the device can be translated into commands, instructions, feedback, etc. depending on the mode of the wearable device.

Among other benefits, examples described herein achieve a technical effect of enhancing user interactivity with other devices and other users. Such interactivity may include utilizing the wearable device to control a self-propelled device, interact with other users of wearable devices, collect and share data, control smart home devices, and the like.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules or components of a system. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein can be implemented, in whole or in part, on computing devices such as digital cameras, digital camcorders, desktop computers, cellular or smart phones, personal digital assistants (PDAs), virtual reality (VR), augmented reality (AR), or mixed reality (MR) headsets, laptop computers, printers, digital picture frames, and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a non-transitory computer usable carrier medium capable of carrying such a program.

System Description

FIG. 1A is a block diagram illustrating an example wearable device utilizing a modular sensing device. According to examples such as shown with FIG. 1A, a modular sensing device is implemented as a multi-modal wearable device 100 which can be utilized in any number of multiple possible modes. Such modes include, but are not limited to a drive mode, a control mode, a finder mode, a mining mode, a training mode, a sword mode, a default mode, an interactive or battle mode, a sharing mode, and a gaming mode. Furthermore, each mode may be selected by the user using either a mode selector 103 on the wearable device 100, or by triggering a certain mode via an inductive pairing 109, using an inductive interface 105 of the wearable device 100, with one or more paired device(s) 108, or a combination of both (e.g., detecting an inductive pairing and then a selection of the mode selector 103).

Additionally or alternatively, the user may connect the wearable device 100 with a mobile computing device, such as the user's smart phone or tablet computer. Mode selection may be performed automatically by the user initiating a designated application of the mobile computing device, such as a smart home application, a controller application (e.g., to control a self-propelled device), a gaming application, and the like. In variations, the user can execute a designated application in connection with the wearable device 100 that enables the user to scroll through the various modes. The user may scroll through the modes on the mobile computing device, or via successive selection inputs on the mode selector 103, which can trigger the mobile computing device to display a selectable mode. In other variations, multiple types of inputs can be performed in the mode selector 103, such as tap gestures and tap and hold gestures, which can correlate to scrolling through the modes and selecting a particular mode respectively. As provided herein, the mode selector 103 can be an input mechanism such as an analog or digital button, a touch panel such as a track pad, or a miniature touch-sensitive display device.

In certain aspects, the wearable device 100 can include a magnetic clasp that enables the user to fit the wearable device 100. For example, in wrist-worn implementations, the wearable device 100 can utilize a magnetic bond to initially calibrate the sizing requirement for the user. Multiple sizings may be available initially, in which the magnetic clasp can be adjusted by the user. For example, the magnetic clasp can include a slidable feature that can be adjusted to any one of multiple detents on a periphery of the wearable device 100. When the right detent is selected, the user can magnetically attach the slidable feature to the selected detent, which can set the size of the wearable device 100. The magnetic coupling between the selected detent and the slidable feature can be stronger than any additional clasp (e.g., a mechanical clasp) that may be engaged and disengaged to attach or remove the wearable device 100.

According to examples described herein, the wearable device 100 can include a memory 130 that stores mode instruction sets 132 for execution by a processing/translation engine 110 depending on the selected mode. Accordingly, when a mode is ultimately selected, the processing/translation engine 110 can generate a mode call 114 to pull a corresponding set of mode instructions 131 from the memory 130 for execution. Pairing data 107 from a paired device 108 (e.g., another wearable device, a self-propelled device, a smart home device, etc.) can include information indicating the type of device, which the processing/translation engine 110 can utilize to execute the appropriate set of mode instructions 131.

Additionally or alternatively, the wearable device 100 can be operable as a standalone, unpaired device in certain modes (e.g., the finder and mining modes, the sword mode, the default mode, and/or the gaming mode). Based on the selected mode, the processing/translation engine 110 can execute the appropriate mode instructions 131 and begin monitoring the one or more sensor(s) 120 of the wearable device 100. In either case, the executed mode instructions 131 can determine the manner in which the processing/translation engine 110 translates the sensor data 122 from the sensor 120. As provided herein, the sensor(s) 120 can detect user gestures performed by the user, and can comprise one or more accelerometers, gyroscopic sensors, inertial measurement unit(s) (IMUs), and magnetometers.

In some aspects, execution of the mode instructions 131 can cause the processing/translation engine 110 to initiate a communication interface 115 to wirelessly communicate with one or more other devices, such as a paired device 108. The communication interface 115 can comprise a wireless communication module, and can be implemented as any type of wireless protocol, such as a BLUETOOTH low energy protocol. Data communications 118 between the wearable device 100 and another device can include received data 117 from the other device, which can further be processed by the processing/translation engine 110 in accordance with the executing mode instructions 131. The received data 117 can also be mode dependent (e.g., command data received from a self-propelled device in the training mode, offensive or defensive data from another wearable device in the interactive mode, or sharing data received in the sharing mode). Additionally, the processing/translation engine 110 can generate data 112 for transmission to the other device depending on the mode. Such transmitted data 112 can be generated based on translating the sensor data 122 and/or in response to the received data 117 from the other device.

In certain aspects, the received data 117 can cause the processing/translation engine 110 to store information in the memory as well (e.g., collected virtual resources to be stored in data logs). Additionally or alternatively, translation of the received data 117 and/or the sensor data 122 can cause the processing/translation engine 110 to generate feedback data 119. The feedback data 119 can be processed by a feedback mechanism 135 of the wearable device 100, which can generate a corresponding feedback output 137. The feedback output 137 can include any combination of haptic, audio, and visual feedback for the user. Thus, the feedback mechanism 135 can include a lighting system that includes one or more lights (e.g., light emitting diodes (LEDs) or a single RGB LED). The feedback mechanism 135 can also include a haptic system to provide vibratory response of varying intensities, and/or an audio system that includes at least one speaker.

The feedback mechanism 135 can also be initiated to provide feedback output 137 (e.g., a combination of haptic, audio, and visual feedback) to assist in connecting with other devices (e.g., a self-propelled device or mobile computing device). In many aspects, the wearable device 100 does not include a display screen, which can typically provide visual feedback regarding BLUETOOTH or Wi-Fi connections. Accordingly, the wearable device 100 can provide a sequence of feedback using the feedback mechanism 135 (e.g., using audio and haptic samples) to assist the user in connecting with other devices. Such feedback can include colored light sequences (e.g., red to green to blue) to indicate successive steps of establishing a connection, as well as audio and haptic feedback to instruct the user to perform a function or to indicate success or failure.

The wearable device 100 can further include a power source 125, such as a battery, that provides electrical power to the various components of the wearable device 100. In some examples, the power source 125 may be coupled to an inductive interface, such as the inductive interface 105 shown in FIG. 1A, that enables the wearable device 100 to charge the power source 125 via induction charging. In variations, the power source 125 can be coupled to a charging port, such as a universal serial bus (USB) port, in which a wired power input 124 can charge the power source 125. Thus, the power input 124 can include an inductive input and/or a wired input to provide charge to the power source 125.

Figure 1B:
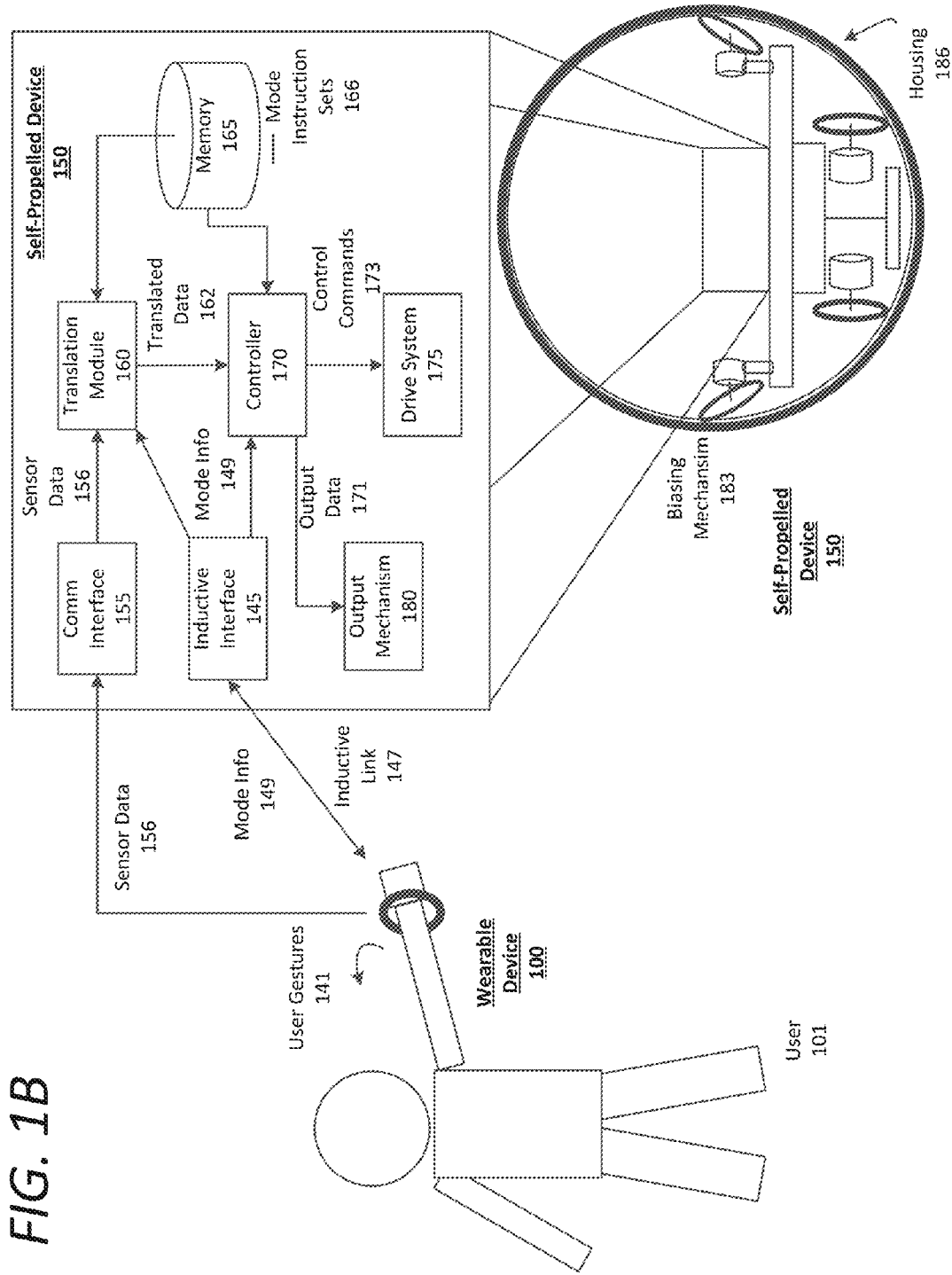
FIG. 1B is a block diagram illustrating an example modular sensing device in communication with a self-propelled device.

FIG. 1B is a block diagram illustrating an implementation of a wearable device 100 in communication with a self-propelled device 150, according to some examples described herein. In the example provided, the wearable device 100 is worn on the wrist of a user 101, and the user 101 can perform various user gestures 141 that can cause the sensors of the wearable device 100 to generate sensor data 106. Furthermore, the arrangement shown in FIG. 1B can be implemented in the drive mode and the training mode of the wearable device 100. In the example shown, the wearable device 100 transmits sensor data 106 to a communication interface 155 of the self-propelled device 150. However, various examples are described herein in which sensor data 106 translation is performed by the wearable device 100 executing certain mode instructions 131 for operating the self-propelled device 150 (e.g., in the drive mode), implementing the self-propelled device 150 in the training mode, or otherwise utilizing the self-propelled device 150 in any of the other modes described herein. Furthermore, execution of a particular mode on the wearable device 100 can cause the self-propelled device 150 to execute a correlated mode itself.

In many examples, the translation module 160 and the controller 170 can execute mode instructions 166 to enable the self-propelled device 150 to operate in multiple modes, such as an autonomous mode, a normal control mode, a drive mode, and a training mode. In normal control mode, the self-propelled device 150 can be operated by a mobile computing device executing a control application. Upon executing the control application on the mobile computing device by the user, the controller 170 and the translation module 160 can operate based on user inputs on a graphical user interface (GUI) generated on a display screen of the mobile computing device.

Referring to FIG. 1B, the user can further initiate a mode on the wearable device 100 can perform an inductive link 147 between the wearable device 100 and an inductive interface 145 of the self-propelled device 150. The inductive link 147 can provide mode information 149 to a controller 170 and a translation module 160 of the self-propelled device 150 via the inductive interface 145. Accordingly, the controller 170 and translation module 160 can pull the appropriate mode instruction set 166 from a memory 165 of the self-propelled device 150 for execution. In examples described herein, the memory 165 can store multiple mode instruction sets 166 corresponding to multiple operable modes.

Once in a specified mode (e.g., the drive mode), the communication interface 155 of the self-propelled device 150 can receive the sensor data 156, from the wearable device 100, corresponding to user gestures 141 performed by the user 101. The sensor data 156 can be translated by the translation module 160 in accordance with the executed mode instruction set 166. The translated data 162 can be transmitted to the controller 170, which can process the translated data 162 to provide control commands 173 to a drive system 175 of the self-propelled device 150. The controller 170 can further process the translated data 162 to generate output data 171, which can be utilized by an output mechanism 180 (e.g., a speaker set, a lighting system, an external accessory device, etc.), which can generate a corresponding output response (e.g., any combination of audio, visual, or motional gestures, such as an anthropomorphic gesture like a head shake or a head nod using an accessory device described herein).

Figure 2:
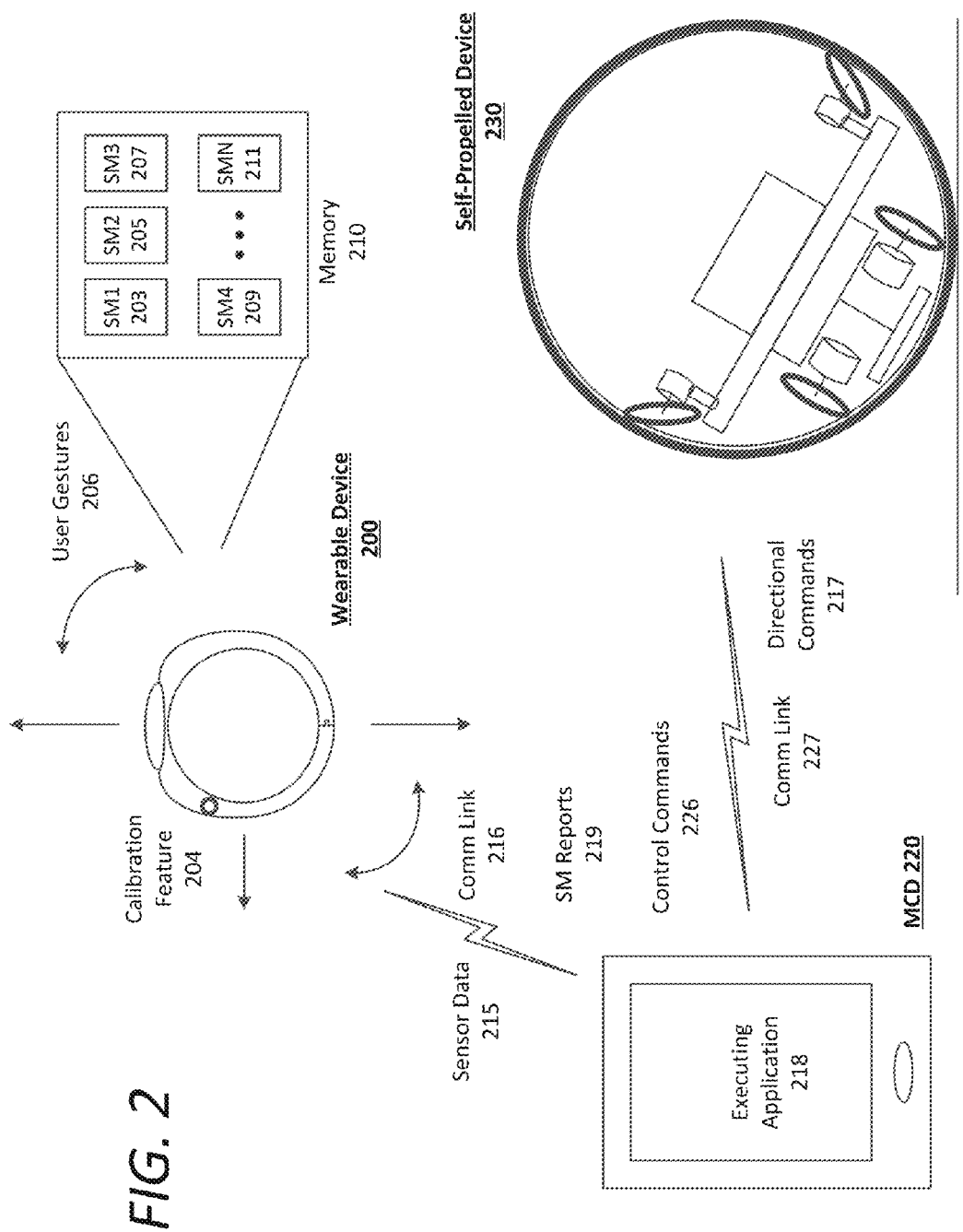
FIG. 2 illustrates an example modular sensing device in communication with a mobile computing device and a self-propelled device.

FIG. 2 illustrates an example modular sensing device (shown as wearable device 200) in communication with a mobile computing device 220 and a self-propelled device 230. In the examples provided in connection with FIG. 2, a communication link 216 can be established between a mobile computing device 220 and the wearable device 200. The communication link 216 can be established upon the user executing a control application 218 on the mobile computing device 220, or upon a user input on the wearable device 200. The communication link 216 can be a short range wireless link, such as a Classic BLUETOOTH or BLUETOOTH low energy link. Furthermore, the mobile computing device 220 can establish a communication link 227 with the self-propelled device 230. In some examples, this communication link 227 can be established according to the same protocol as the communication link 216 between the wearable device 200 and the mobile computing device 220. In such examples, the wearable device 200, the mobile computing device 220 and the self-propelled device 230 can all be wirelessly coupled in a single piconet within the short communication range of the wireless protocol (e.g., BLUETOOTH low energy).

The user wearing the wearable device 200 can perform user gestures 206, and sensor data 215 corresponding to those gestures 206 can be streamed to the mobile computing device 220 over the communication link 216. The executing control application 218 on the computing device 220 can cause processing resources of the computing device 220 to translate the sensor data 215 into control commands 226, which can be transmitted to the self-propelled device 250 over the communication link 227. The control commands 226 can be received by the control system 254 of the self-propelled device 250 and implemented on the drive system 252, as described herein.

The user gestures 206 may be any movements or actions performed by the user using the wearable device 200. For example, if the wearable device 200 is a wrist-worn device, the user can perform arm actions to control movement of the self-propelled device 250. In certain implementations, the arm actions can include the user raising or lowering an arm wearing the wrist-worn device, rotating the arm, moving the arm from side-to-side, and various combinations of movements and gestures. Each of these actions can include a specific sensor profile, which can be detected by the mobile computing device 220. Accordingly, the mobile computing device 220 can receive sensor data 215 corresponding to the user actions, where each of the actions may be identifiable in the sensor data 215 as individual sensor patterns in the data 215.

The translation performed by the mobile computing device 220 can be based on an identification of each sensor pattern and a correlated translation into a specified control command. For example, when the user raises the arm, an accelerometer and/or gyroscopic sensor in the wrist-worn device can output the corresponding data 215 to the mobile computing device 220. The data 215 can indicate the arm raising motion, and the executing control application 218 can translate the data 215 into a control command 226 to accelerate the self-propelled device 250 forward. When the user's arm is lowered, the corresponding control command 226 can cause the self-propelled device 250 to brake or otherwise decelerate.

In some examples, mobile computing device 220 can include a database mapping sensor patterns to individual control commands 226, such that when a sensor pattern is detected in the sensor data 215, the mobile computing device 220 can immediately identify a correlated control command 226 and transmit the control command 226 to the self-propelled device 230 for implementation. Accordingly, sensor data 215, corresponding to the user gestures 206 performed by the user, can be processed into control commands 226 by the mobile computing 220, which may then be transmitted to the self-propelled device 230 for implementation.

In certain implementations, the device 200 can be space limited, and only include a limited amount of memory and computational resources. In such implementations, the wearable device 200 can represent each gesture that can be performed by a user as a simple state machine. Thus, for each gesture, a state machine corresponding to that gesture can either positively identify its gesture or negatively identify its gesture. When a positive gesture is identified, the state machine corresponding to that gesture can report the positive identification to the mobile computing device 220 or the self-propelled device 230, which can execute a control command 226 based on the gesture associated with the state machine.

As an illustration, the wearable device 200 can include a memory 210 implementing a number of state machines (e.g., SM1 203, SM2 205, SM3 207, SM4 209, . . . , SMN 211), each being associated with a particular gesture. For example, SM1 203 can be associated with the user raising an arm, SM2 205 can be associated with the user lower an arm, SM3 207 can be associated with the user pointing an arm to the right, and SM4 209 can be associated with the user pointing an arm to the left. Furthermore, any number of state machines may be implemented in the memory 210 representing any number of gestures. At any given time step, the state machines can be instantiated for each gesture type, and each state machine can inspect the instantaneous sensor data to determine whether to update its state. If at any time after instantiating, a respective state machine determines that its associated gesture is not being performed, it can request destruction, immediately releasing its memory resources, until the gesture is complete, and/or the state machine can reinstantiate accordingly. If, however, the state machine determines that its associated gesture has been completed, the state machine reports the event (i.e., its state change) to the mobile computing device 220 or the self-propelled device 230 and releases its memory resources and/or reinstantiates.

As an example, state machine (n) (SMN 211) can be associated with a gesture that causes the self-propelled device 230 to turn left. The associated gesture may be the user having an arm raised and pointing left, and can have a correlated sensor pattern that, if detected by SMN 211, cause the state of SMN 211 to change—which, in turn, causes SMN 211 to report the state change in a state machine report 219 to the mobile computing device 220 or the self-propelled device 230. The state machine report 219 can ultimately cause the self-propelled device 230 to execute the control command 226 associated with the gesture—in this case, turn left.

As provided herein, the memory 210 of the wearable device 200 can comprise any number of state machines that transition states when their associated gestures are identified in the sensor data. For each gesture performed by the user, each of the state machines in the memory 210 can monitor the sensor data for its associated sensor pattern. The wearable device 200 arrangement shown in FIG. 2 can be utilized for any of the modes discussed herein. Furthermore, the wearable device 200, including the state machine embodiment, can operate in conjunction with an executing application 218 on a connected mobile computing device 220.

The mobile computing device 220 can receive each state machine report 219 indicating the gestures performed by the user wearing the wearable device 200, and generate a corresponding instruction or command depending on the mode, as described herein.

In the example shown in FIG. 2, the mobile computing device 220, executing a designated application 218, can identify the mode of the wearable device 200. The mode can determine the manner in which the mobile computing device 200 translates each state machine report received, and the corresponding response.

In variations, one or more examples described herein provide for the wearable device 200 itself to handle the state machine reports 219, execute feedback based on the reports, and/or transmit data (e.g., control commands 226 to the self-propelled device 230) corresponding to each state machine report 219 in accordance with the selected mode.

Control Mode

Figure 3A:
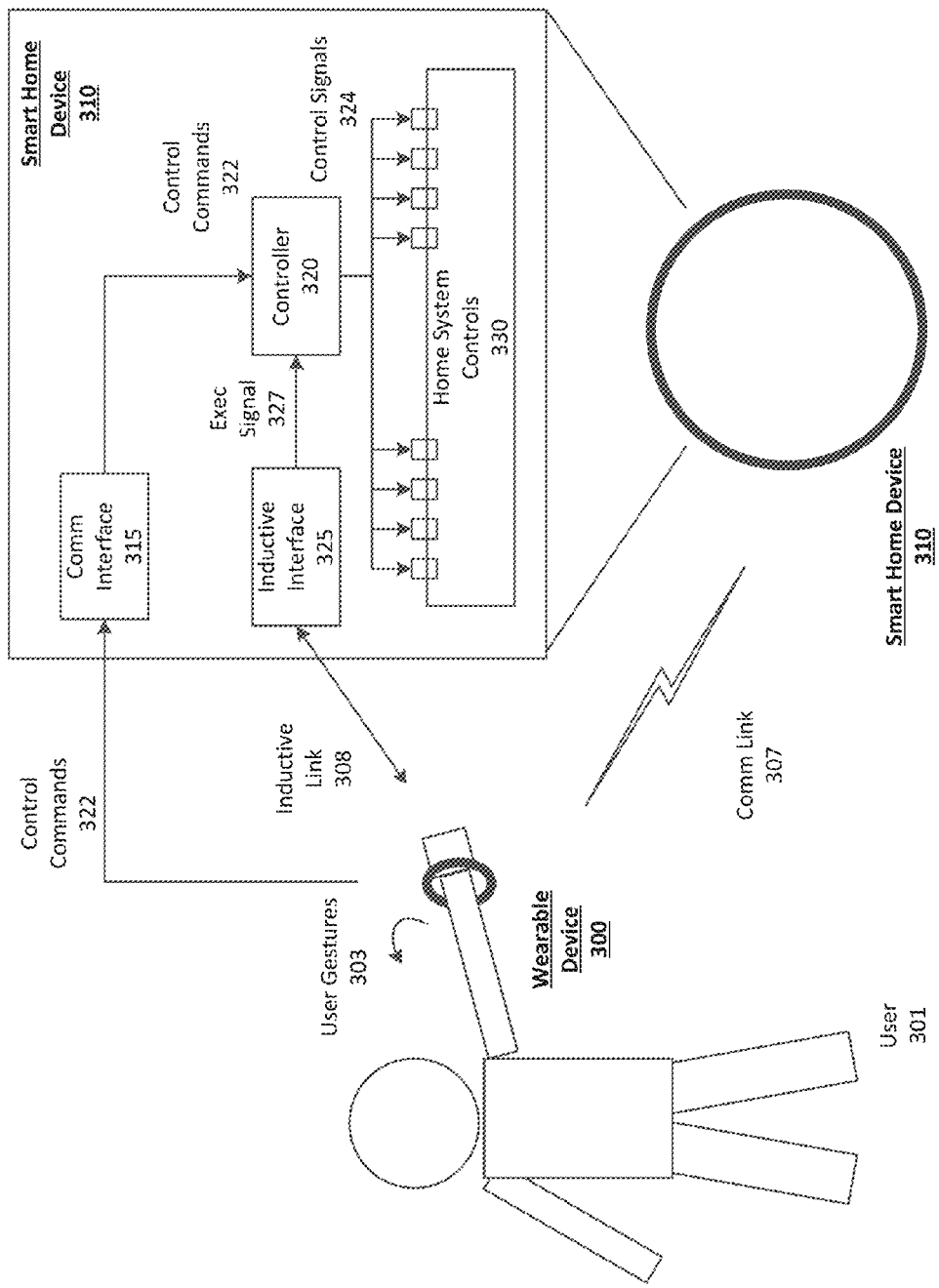
FIG. 3A is a block diagram illustrating an example modular sensing device implemented in connection with a smart home device.

FIG. 3A is a block diagram illustrating an example modular sensing device implemented in connection with a smart home device. The smart home device 310 can be any home device operable by wireless signals, such as a home appliance, a garage door, a heating and cooling system, a lighting system, an audio system, and the like. Furthermore, the wearable device 300 shown in FIG. 3A may be the same as the wearable devices 100, 200 shown and described with respect to FIGS. 1A and 2. Referring to FIG. 3A, the user 301 can cause the wearable device 300 to inductively link 308 with an inductive interface 325 of the respective smart home device 310 to establish a communication link 307. In certain aspects, the inductive link 308 can trigger the control mode on the wearable device 300, or the user 301 can preselect the control mode. As described herein, the control mode can cause a processing/translation engine 110 of the wearable device to execute control mode instructions to generate control commands to operate the smart home device 310. Furthermore, upon establishing the inductive link 308, the smart home device's 310 inductive interface 325 can trigger an execution signal 327 to initiate a controller 320 of the smart home device 310.

In many examples, the user 301 can perform user gestures 303 with the wearable device 300, which can translate the gestures 303 into control commands 322 to be transmitted to a communication interface 315 of the smart home device 310. The control commands 322 can be processed by the controller 320 of the smart home device 310, which can generate control signals 324 for various aspects of home system controls 330 operable by the smart home device 310.

As described herein, the home system controls 330 can correspond to an "on" switch for an appliance—which can be triggerable by a corresponding gesture performed by the user 301—"open" or "close" actions for a garage door, temperature controls for a home heating and cooling system, volume controls for a home audio and/or television system, lighting controls for a home lighting system (e.g., to dim or brighten lights in a room, or to select various colors of lights), and the like.

Figure 3B:
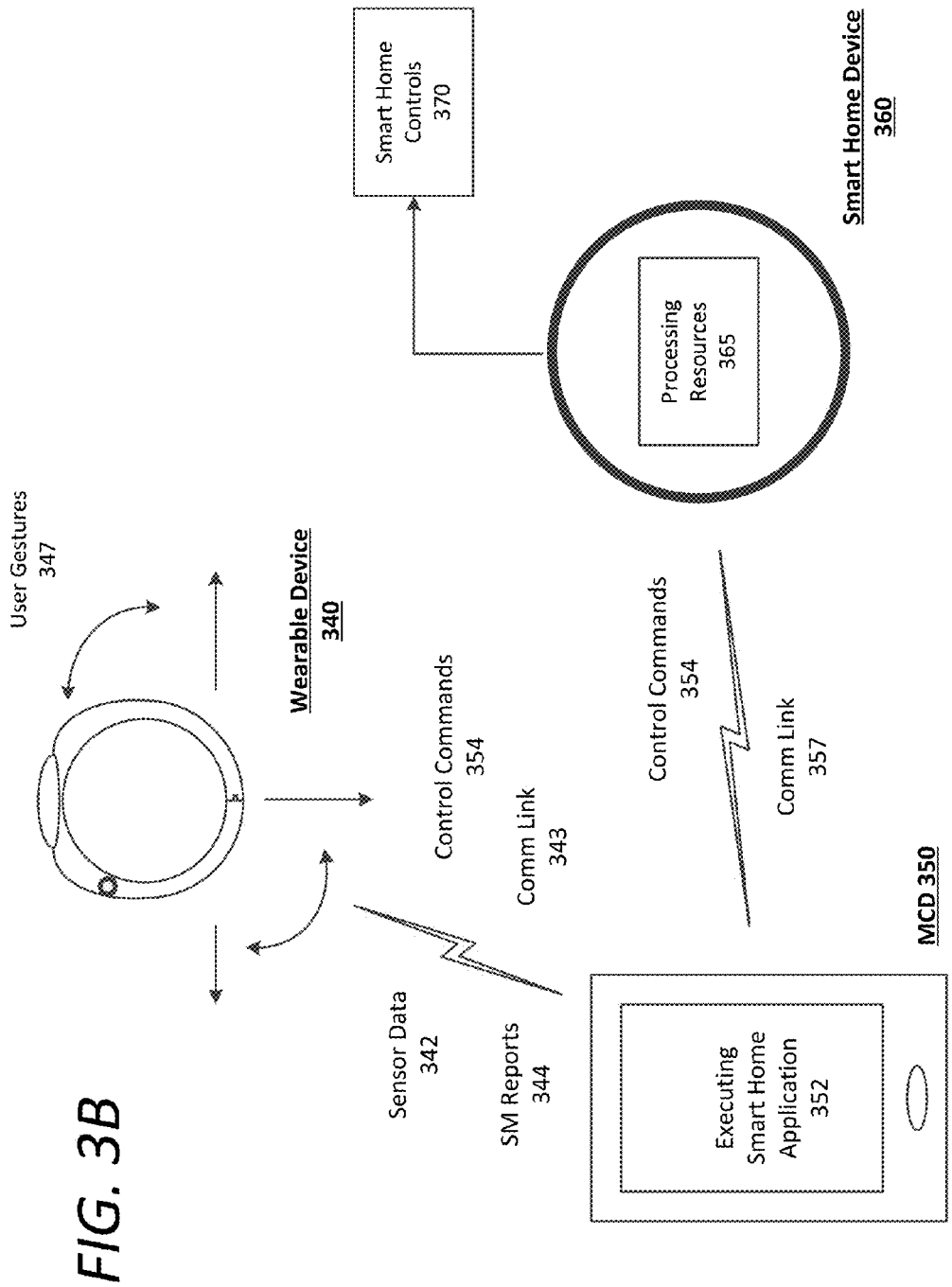
FIG. 3B illustrates an example modular sensing device implemented to operate a smart home device via a connected mobile computing device.

FIG. 3B illustrates an example modular sensing device implemented to operate a smart home device via a connected mobile computing device, as described herein. The control mode on the wearable device 340 can be triggered by, for example, the user executing a smart home application 352 on a mobile computing device 350. Execution of the smart home application 352 can cause the mobile computing device 350 to establish a communication link 357 with the smart home device 360, and a communication link 343 with the wearable device 340.

According to certain aspects, user gestures 347 performed by the user in the control mode can result in sensor data 342 being transmitted to the mobile computing device 350, which can translate the sensor data 342 into control commands 354 for transmission to and execution by the smart home device 360. The smart home device 360 can include processing resources 365 that can execute the control commands 354 to operate various smart home controls 370, as described herein.

In some examples, the wearable device 340 can include various state machines (described in detail above), each of which only transitions states and generates reports when an associated sensor pattern is identified—corresponding to a specified user gesture 347. Thus, the wearable device 340 can transmit each generated state machine report 344, indicating a specified user gesture, to the mobile computing device 350. The mobile computing device 350 can then generate control commands 354 based on the state machine reports 344 for execution by the smart home device 360.

In variations, the wearable device 340 can identify and construct control commands 354 itself based on user gestures 347 performed by the user. The wearable device 340 can monitor sensor data actively for translation into control commands 354, or can process state machine reports 344 into control commands 354, as described herein.

Control Mode Methodology

Figure 4:
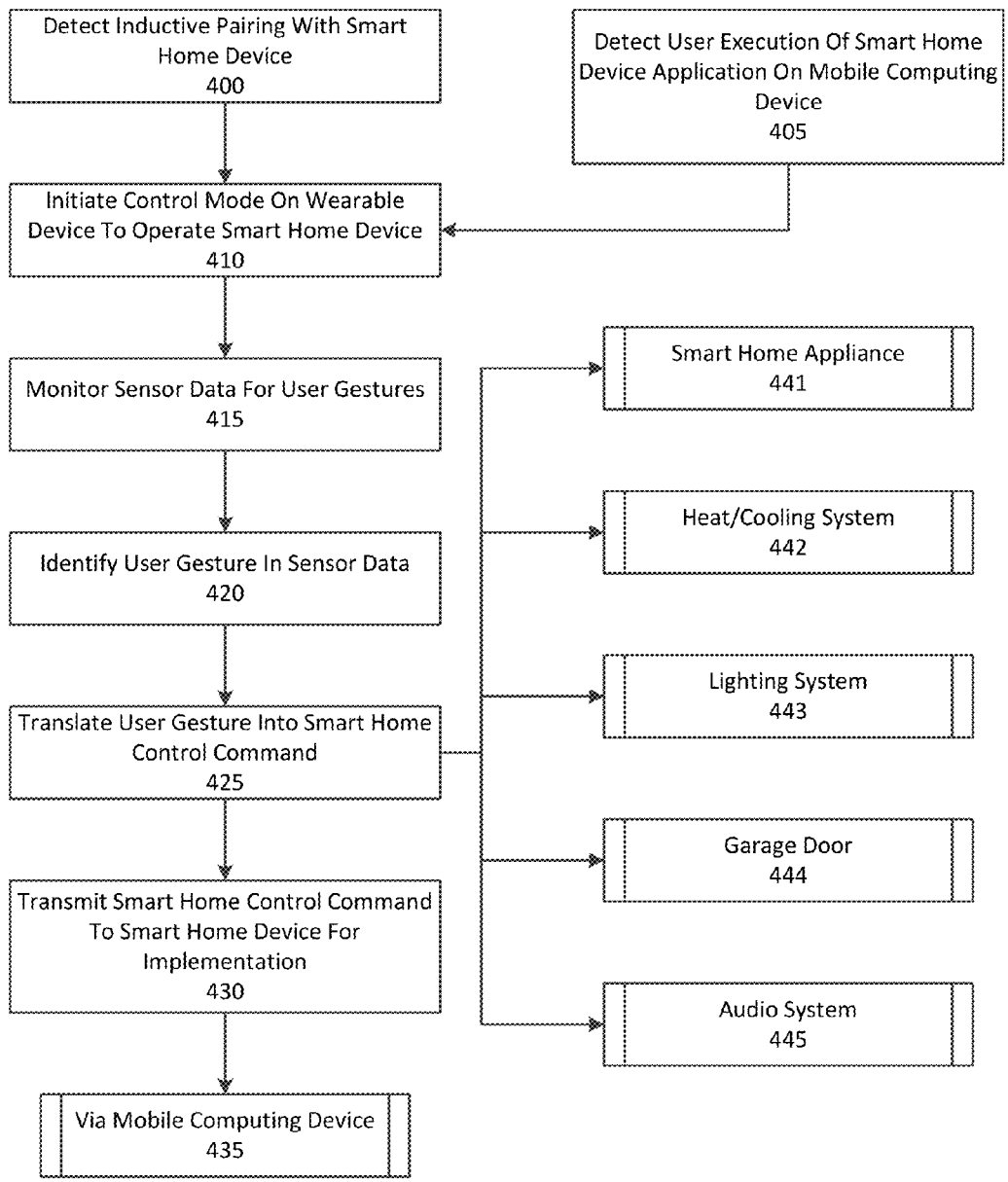
FIG. 4 is a flow chart describing an example method of operating a smart home device utilizing a wearable device.

FIG. 4 is a flow chart describing an example method of operating a smart home device utilizing a modular sensing device. In the examples described with respect to FIG. 4, reference may be made to like reference characters representing elements shown and described with respect to FIGS. 3A and 3B. Referring to FIG. 4, a wearable device 300 can detect an inductive pairing with a smart home device 310 (400). In response to the inductive pairing, the wearable device 300 can initiate the control mode to operate the smart home device 310 (410). Thereafter, a connection can be established with the smart home device 310 can the wearable device can monitor sensor data for user gestures (415). Alternatively, the wearable device 300 can detect a user execution of a smart home device application 352 on the user's mobile computing device 350 (405), which can trigger the control mode on the wearable device 300 (410).

According to many examples, the wearable device 300 can identify a user gesture in the sensor data (420), and translate the user gesture into a corresponding smart home control command, based on the connected smart home device 310 (425). The wearable device 300 can then transmit the smart home control command to the smart home device for implementation or execution (430). As described herein, the wearable device 300 can transmit the control commands directly to the smart home device 310, or via a mobile computing device 350 executing a smart home application 352 for controlling the smart home device 310 (435).

As described herein, the control commands can be executed by a respective smart home device to which the wearable device 300 is connected. Such devices can include a smart home appliance (441), a heating and cooling system (442), a lighting system (443), a garage door system (444), and the like. Furthermore, the control commands can be operable to control any adjustable parameter of a particular smart home device, such as lighting brightness, home temperature, appliance features, audio volume, channel selection (e.g., for a television or radio), "on" and "off" states for various smart home devices, and the like.

Hardware Diagrams

Figure 5:
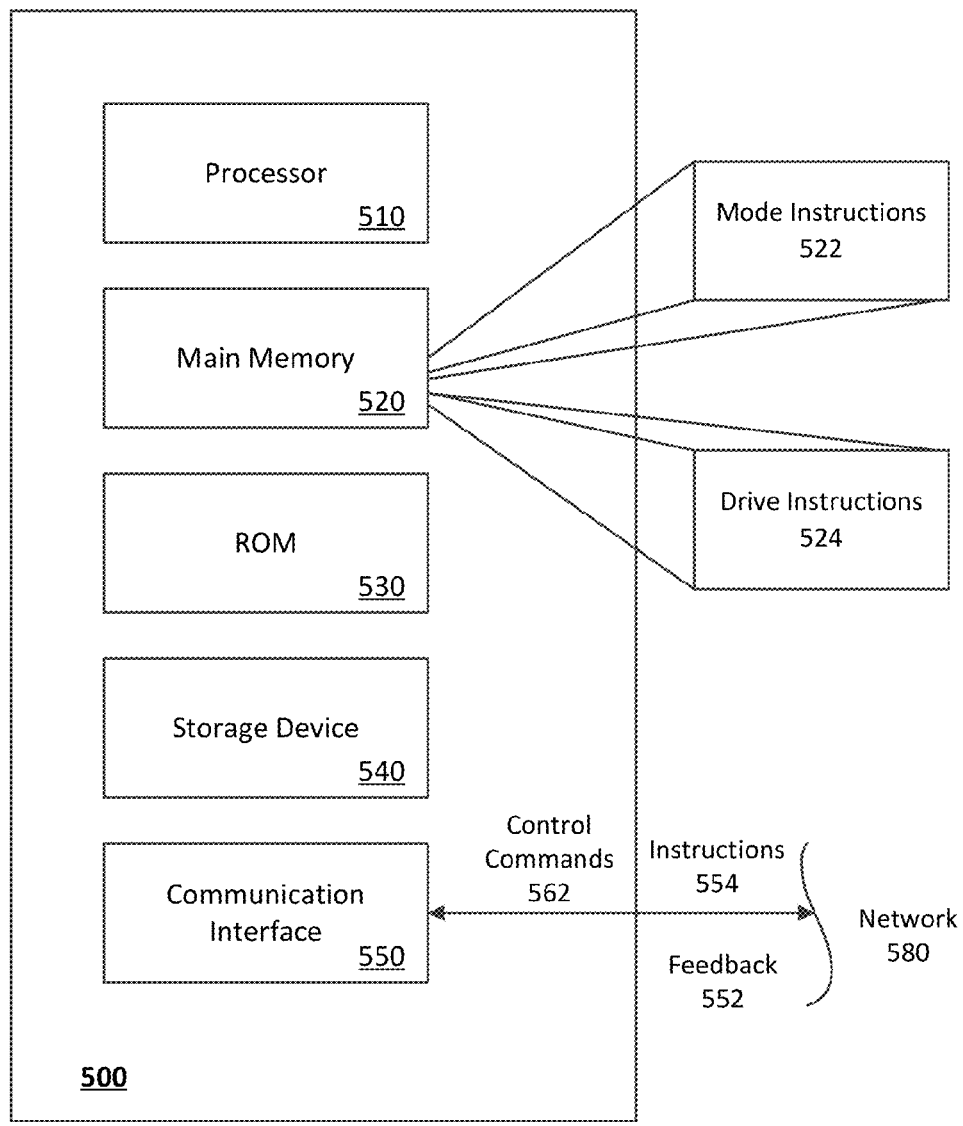
FIG. 5 is a block diagram of an example computer system upon which examples described herein may be implemented.

FIG. 5 is a block diagram that illustrates a computer system upon which certain examples described may be implemented. For example, one or more components discussed with respect to the self-propelled device of FIG. 1B and FIG. 2, and the methods described herein, may be performed by the system 500 of FIG. 5.

In one implementation, the computer system 500 includes processing resources 510, a main memory 520, ROM 530, a storage device 540, and a communication interface 550. The computer system 500 includes at least one processor 510 for processing information and a main memory 520, such as a random access memory (RAM) or other dynamic storage device, for storing information and instructions to be executed by the processor 510. The main memory 520 also may be used for storing temporary variables or other intermediate information during execution of instructions to be executed by the processor 510. The computer system 500 may also include a read only memory (ROM) 530 or other static storage device for storing static information and instructions for the processor 510. A storage device 540, such as a magnetic disk or optical disk, is provided for storing information and instructions. For example, the storage device 540 can correspond to a computer-readable medium that store instructions performing sensor data processing and translation operations as discussed herein.

The communication interface 550 can enable computer system 500 to communicate with a computing device and/or wearable device (e.g., via a cellular or Wi-Fi network) through use of a network link (wireless or wired). Using the network link, the computer system 500 can communicate with a plurality of devices, such as the wearable device, a mobile computing device, and/or other self-propelled devices. The main memory 520 of the computer system 500 can further store the drive instructions 524, which can be initiated by the processor 510. Furthermore, the computer system 500 can receive control commands 562 from the wearable device and/or mobile computing device. The processor 510 can execute the drive instructions 524 to process and/or translate the control commands 562—corresponding to user gestures performed by the user—and implement the control commands 552 on the drive system of the self-propelled device.

Additionally, the main memory 520 can further include mode instructions 524, which the processor 510 can execute to place the self-propelled device in one or multiple modes to interact with the wearable device. In some examples, execution of the mode instructions 522 can place the self-propelled device in an operational mode that provides feedback 552 and/or instructions 554 to the wearable device over the network 580 (e.g., in training mode).

Examples described herein are related to the use of computer system 500 for implementing the techniques described herein. According to one example, those techniques are performed by computer system 500 in response to processor 510 executing one or more sequences of one or more instructions contained in main memory 520. Such instructions may be read into main memory 520 from another machine-readable medium, such as storage device 540. Execution of the sequences of instructions contained in main memory 520 causes processor 510 to perform the process steps described herein. In alternative implementations, hard-wired circuitry and/or hardware may be used in place of or in combination with software instructions to implement examples described herein. Thus, the examples described are not limited to any specific combination of hardware circuitry and software.

Figure 6:
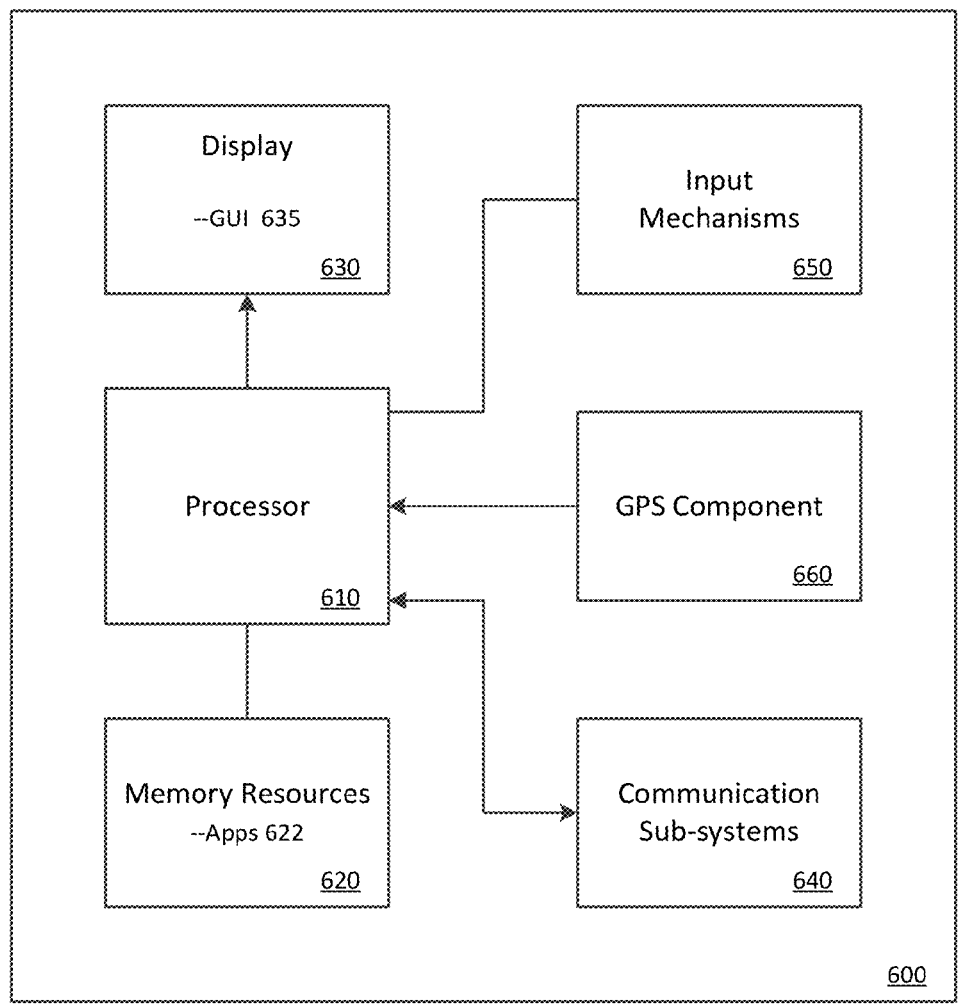
FIG. 6 is a block diagram of a mobile computing device upon which examples described herein may be implemented.

FIG. 6 is a block diagram that illustrates a mobile computing device upon which examples described herein may be implemented, such as the mobile computing device 220 of FIG. 2. In one example, the computing device 600 may correspond to, for example, a cellular communication device (e.g., feature phone, smartphone, etc.) that is capable of telephony, messaging, and/or data services. In variations, the computing device 600 can correspond to, for example, a tablet or wearable computing device.

In an example of FIG. 6, the computing device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), and one or more location detection mechanisms (e.g., GPS component) 660. In one example, at least one of the communication sub-systems 640 sends and receives cellular data over data channels and voice channels.

The memory resources 620 can store a designated control application 622, as one of multiple applications, to initiate the communication sub-system 640 to establish one or more wireless communication links with the self-propelled device and/or a wearable device. Execution of the control application 622 by the processor 610 may cause a specified graphical user interface (GUI) 635 to be generated on the display 630. Interaction with the GUI 635 can enable the user to calibrate the forward directional alignment between the self-propelled device and the computing device 600. Furthermore, the GUI 635 can allow the user to initiate a task-oriented operation (e.g., a game) to be performed by the user in conjunction with operating the self-propelled device with user gestures using the wearable device, as described herein.

Figure 7:
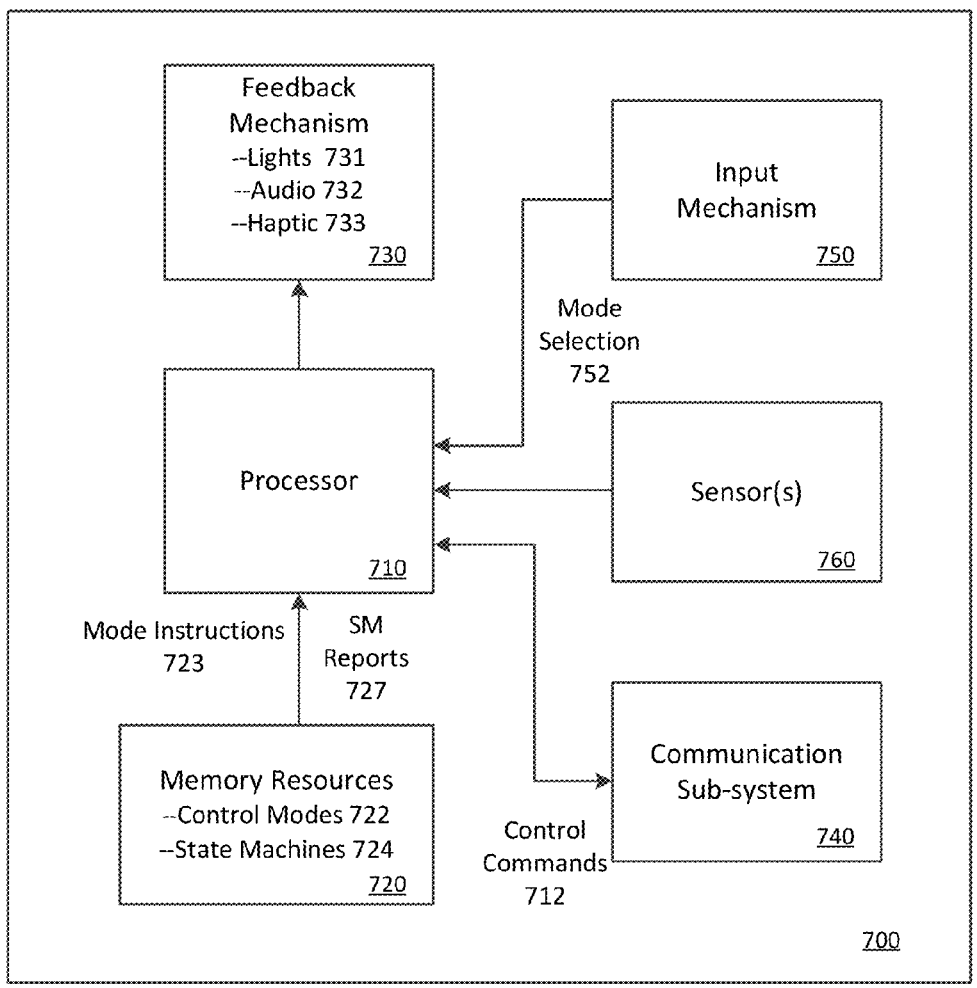
FIG. 7 is a block diagram of an example modular sensing device upon which examples described herein may be implemented.

FIG. 7 is a block diagram of an example modular sensing device upon which examples described herein may be implemented, such as the wearable device 100 of FIG. 1A.

In an example of FIG. 7, the modular sensing device 700 includes a processor 710, memory resources 720, a feedback mechanism 730 (e.g., audio 732, haptic 733, visual 731 devices), a communication sub-systems 740 (e.g., wireless communication sub-systems such as BLUETOOTH low energy), one or more sensors 760 (e.g., a gyroscopic sensor or accelerometer) and an input mechanism 750 (e.g., an analog or digital mode selector). In one example, the communication sub-system 740 sends and receives data over one or more channels.

The memory resources 720 can store mode instructions 723 corresponding to a plurality of control modes 722, as described herein, which can be executed by the processor 710 to initiate a particular mode. Certain executing mode instructions 723 can initiate the communication sub-system 740 to establish one or more wireless communication links with the self-propelled device and/or the mobile computing device. Execution of a control mode 722 by the processor 710 may cause the processor 710 to generate distinct feedback responses using the feedback mechanism 730 based on sensor data from the sensor(s) 760 indicating user gestures performed by the user.

In some examples, the memory resources 720 can comprise a number of state machines 724 which can provide state machine reports 727 to the processor 710 can specified sensor patterns are identified by respective states machines 724. Each state machine 724 may monitor for a single sensor pattern which, if identified by that state machine 724, can cause the state machine 724 to transition states, thereby providing a state machine report 727 to the processor 710 identifying the user gesture performed. The processor 710 can translate the state machine reports 727—which indicate the user gestures—in accordance with an executing set of mode instructions 723 in order to generate a corresponding output via the feedback mechanism 730 and/or control commands 712 to be communicated to the self-propelled device via the communication sub-system 740.

While examples of FIG. 5, FIG. 6, and FIG. 7 provide for a computer system 500, a computing device 600, and a modular sensing device 700 for implementing aspects described, in some variations, other devices of the three can be arranged to implement some or all of the functionality described with the processing resources of the self-propelled device 150 of FIG. 1B, the mobile computing device 220 of FIG. 2, or the wearable device 100 of FIG. 1A, as shown and described throughout.

With further reference to examples of FIG. 5, FIG. 6, and FIG. 7, some examples include functionality for projecting an orientation and/or perspective of a user onto a gaming environment via sensing output of the modular sensing device 700. For example, when the modular sensing device 700 is worn, the orientation and perspective of the user can be inferred from sensors 760 (e.g., IMU), and this sensor information can be virtualized for the gaming environment. For example, the gaming environment can be shown on a computing device (e.g., display screen of a computer, mobile computing device etc.). The gaming environment can a perspective that is based on the orientation of the user (e.g., user is standing north), as determined by the modular sensing device 700. The perspective can change as the user changes orientation, moves in a particular direction etc. In some examples, the modular sensing device 700 can be used to control a virtual or actual object (e.g., self-propelled device), and the orientation and direction of the controlled object may be with reference to a reference frame of the user.

In variations, a reference frame of the self-propelled device may be used, and the user's orientation can be used to influence control of the virtual or actual device in motion. For example, the user's movement or motion can influence a change of direction. Alternatively, both orientations can be used concurrently. For example, if the device under control is a virtual vehicle that carries the user, the user may turn his head (e.g., when wearing a necklace carrying the modular sensing device) to see a view to a particular side while the orientation of the vehicle is used for the motion of the vehicle.

Multi-Device Usage

FIG. 8 illustrates an embodiment of multiple sensing devices that concurrently provide input for a program or application which utilizes the inputs, along with inferences which can be made about a person or object that carries the devices, according to one or more examples. In particular, an example such as shown enables input from multiple sensing devices to be used for purpose of enabling inferences of movement and pose from two relevant sources of user motion. For example, in FIG. 8, a user 801 carries wearable devices in the form of a wrist-worn device 810 and pendant 812. In other examples, one or both of the wrist-worn device 810 and pendant 812 can be in the form of an alternative form factor or device type. For example, the combination of sensing devices can include a hat, a ring, eyeglasses or a device which the user can carry in his or her hand (e.g., FOB, mobile computing device). In variations, more than two wearable devices can be employed by one user.

FIG. 9 illustrates a system which concurrently utilizes input from multiple sensing devices in connection with execution of an application or program. With reference to an example of FIG. 9, a multi-device system 900 includes a first modular sensing device 910, a second modular sensing device 920, and a controller 930. Each of the first and second modular sensing devices 910, 920 includes a respective inertial measurement unit (IMU) 912, 922, a processor 914, 924 and memory 916, 926. The IMU 912, 922 of each modular sensing device 910, 920 can include sensors such as an accelerometer 915, 925 and gyroscopic sensor 917, 927. The first and second modular sensing devices 910, 920 may also include additional sensing resources, such as a magnetometer and/or proximity sensor.

The controller 930 can include a processor 932 and a memory 934. The processor 932 can execute instructions 935 for a program or application that can execute and process inputs 911, 913 from each of the respective modular sensing devices envies 910, 920. In some variation, the controller 930 is a mobile computing device, such as a multi-purpose wireless communication device which can wirelessly communicate with each of the first and second modular sensing devices 910, 920.

While an example of FIG. 9 illustrates the controller 930 as a separate device from the first and second modular sensing devices 910, 920, variations provide that the controller 930 is integrated or otherwise combined with at least one of the first or second modular sensing devices 920, 910. For example, the controller 930 can include a multi-purpose wireless communication device that is equipped with a gyroscopic sensor and accelerometer. Thus, for example, variations can provide the second modular sensing device 920 to be a local resource of the controller 930, which communicates with the first modular sensing device 910.

With further reference to FIG. 9, the controller 930 can receive inputs 911, 913 from respective first and second modular sensing devices 910, 920. The inputs 911, 913 can be received in connection with an application 939 or program that is executed by the processor 932 of the controller 930. The processor 932 can execute the instructions 945 in order to implement an inference engine 935 for determining inferences about the person or object with one or both of the modular sensing devices 910, 920. For example, the application 939 can correspond to a game or simulation, and the inference engine 935 can be specific to the application 939. Among other applications, the inference engine 935 can be used to determine when the motions of two modular sensing devices 910, 920 are separate and distinct from one another, or continuous and/or part of the same input motion.

According to one implementation, each input 911, 913 can correspond to one or more of a position, height, orientation, velocity, linear and/or rotational acceleration. Each of the first and second sensing devices 910, 920 generate a set of measured (or sensed data) corresponding to, for example, a movement (e.g., gesture) made with the respective sensing device 910, 920. Additionally, the controller 930 can process input 911, 913 corresponding to each of the respective data sets in order to determine a third data set of inferences. In this way, the inferences reflect information determined from sensed data, rather than directly measured data. The inferences can be outputted from the inference engine 935 can be determinative or probabilistic, depending on implementation.

With reference to an example of FIG. 8, user 801 can wear two modular sensing devices, and the inference engine 935 can assume some inferences based on anatomical constraints and/or context (e.g., such as provided from execution of the application 939). For example, each of the first and second modular sensing devices 910, 920 can correspond to a wearable wrist device. Alternatively, the second modular sensing device 920 can correspond to the pendant 812 or neck-worn device. By way of example, if the first modular sensing device 910 (wrist device 810) is detected to be in motion, the inference engine 935 can be used to determine additional position data for the movement of that device along a third axis based on orientation, position or context of second modular sensing device 920 (wrist device 811 or pendant device 812). For example, if the first modular sensing device 910 (wrist-worn device 811) measures an arc motion, and the second modular sensing 920 is the pendant, then the orientation of the second modular sensing device can indicate whether, for example, the arc motion is in front of the user or to the user's side. Alternatively, if the second modular sensing device 920 is the second wrist device 812, the information sensed from the second wrist device can identify the corresponding hand or device as being in front of the body. In such an orientation, the inference engine 935 can determine the inference to be that the user is making the arc of motion in front of his body. Similarly, if the height of the second sensing device 920 is determined to be belt high and the device is held by the user, the orientation of the user's torso can be inferred (along with the direction of the arc).

In examples in which the second modular sensing device 920 is a pocket device (e.g., mobile computing device, FOB), information can be determined from, for example, the height of the device (e.g., user standing, crouching or jumping) and the rotation of the device. For example, if the second modular sensing device 920 is pocket word, a change in the orientation of the device from vertical to horizontal, in combination with a downward acceleration can indicate the user is crouching. If the user is crouching, for example, the type of motion that is likely by the first modular sensing device 910 may be limited (e.g., motion of the wrist device 810 is likely in front of user when user is moving up or down).

Modular Sensing Device

Figure 10:
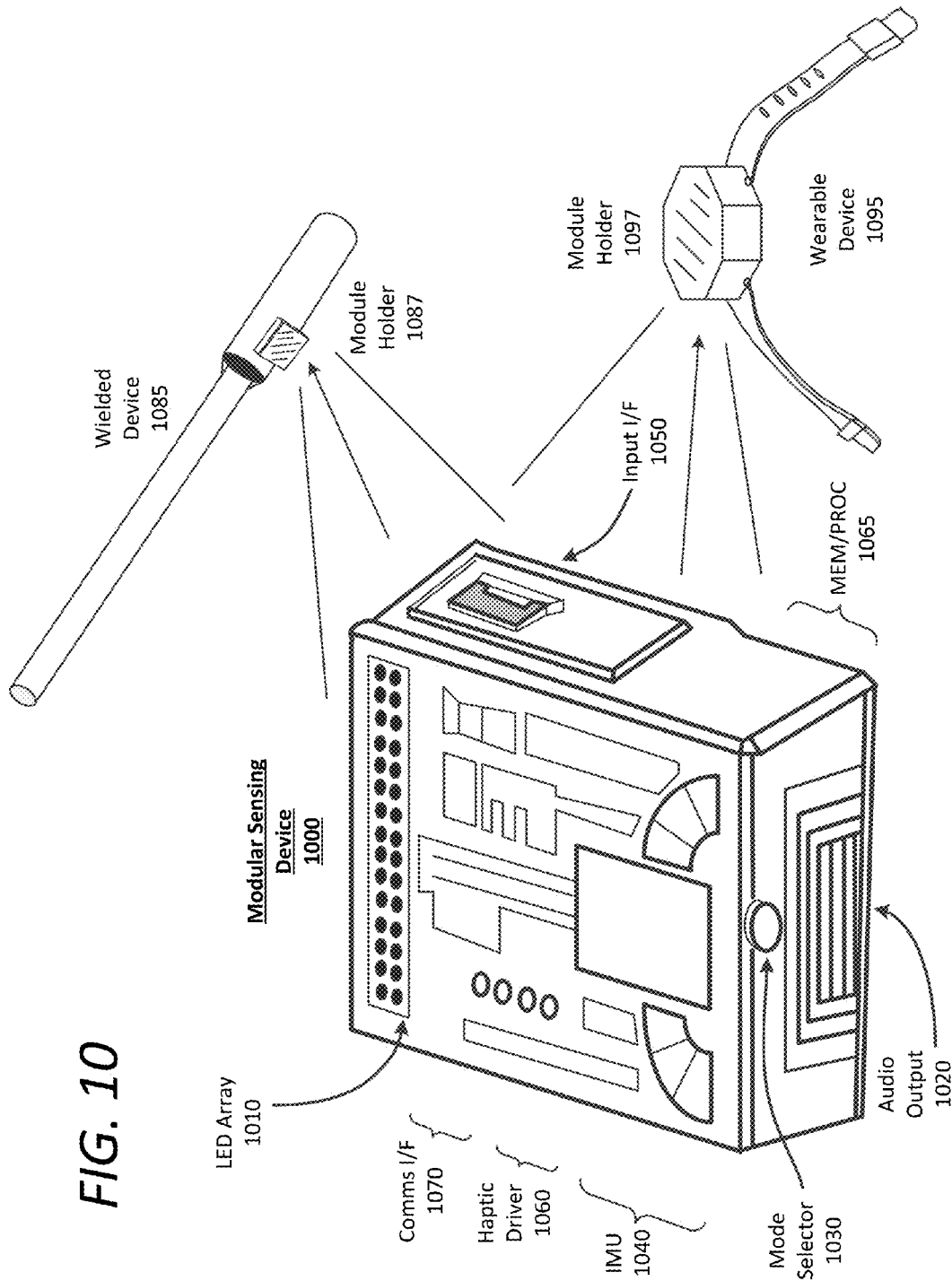
FIG. 10 illustrates an example modular sensing device insertable into a plurality of compatible apparatuses.

FIG. 10 illustrates an example modular sensing device insertable into a plurality of compatible apparatuses. The modular sensing device 1000 shown in FIG. 10 can comprise various components and modules of the modular sensing devices and wearable device as shown and described herein. Referring to FIG. 10, the modular sensing device 1000 can include a number of output devices, such as an LED array 1010, an audio output device 1020 (e.g., a speaker), and a haptic driver 1060 (included within the device). Furthermore, the modular sensing device 1000 can include a mode selector 1030, which can comprise an analog or digital button to enable the user to select a particular mode of the device 1000 by, for example, scrolling through a stored series of modes. The modular sensing device 1000 can further include memory and processing resources 1065 that can execute the selected mode (either in the state machine implementation (FIG. 1B) or the executed instruction set implementation (FIG. 1A) described herein).

In various aspects, the modular sensing device 1000 also includes a communications interface 1070 (e.g., a BLUETOOTH low energy, WiFi, WiGig, WiMAX, or cellular radio interface), and an IMU 1040 to provide the memory and processing resources 1065 with sensor data for detecting gestures performed by the user. As described herein, depending on the mode and sub-mode of the device 1000 the memory and processing resources 1065 interpret the sensor data to generate outputs via the output devices 1010, 1020, 1060 and/or commands or responses to be output to a connected device via the communications interface 1070 (e.g., a remotely operated device or another modular sensing device). Furthermore, in some implementations, the modular sensing device 1000 can include an input interface 1050 (e.g., a mini-USB port) to enable charging of one or more batteries and/or uploading of additional mode instructions. In variations, the modular sensing device 1000 can include an induction interface to charge one or more batteries and/or to enable inductive pairing with a second device to establish a wireless communications link.

In the various examples described herein, the modular sensing device 1000 can be insertable into or otherwise attachable to any number of compatible apparatuses, such as wearable devices 1095 (wrist devices, rings, pendants, hats, glasses, etc.) wielded devices 1085, companion toys or dolls, and the like. Furthermore, the modular sensing device 1000 can be implemented in various other form factors, can be sewn into clothing, or can be mounted, glued, or otherwise attached to various apparatuses. Such apparatuses can each include a module holder 1087, 1097 into which the modular sensing device 1000 may be inserted or otherwise mounted or attached. Thus, according to examples provided herein, the user can utilize the apparatuses into which the modular sensing device 1000 has been inserted or attached, to perform various gestures in accordance with a selected mode of the modular sensing device 1000.

Figure 11:
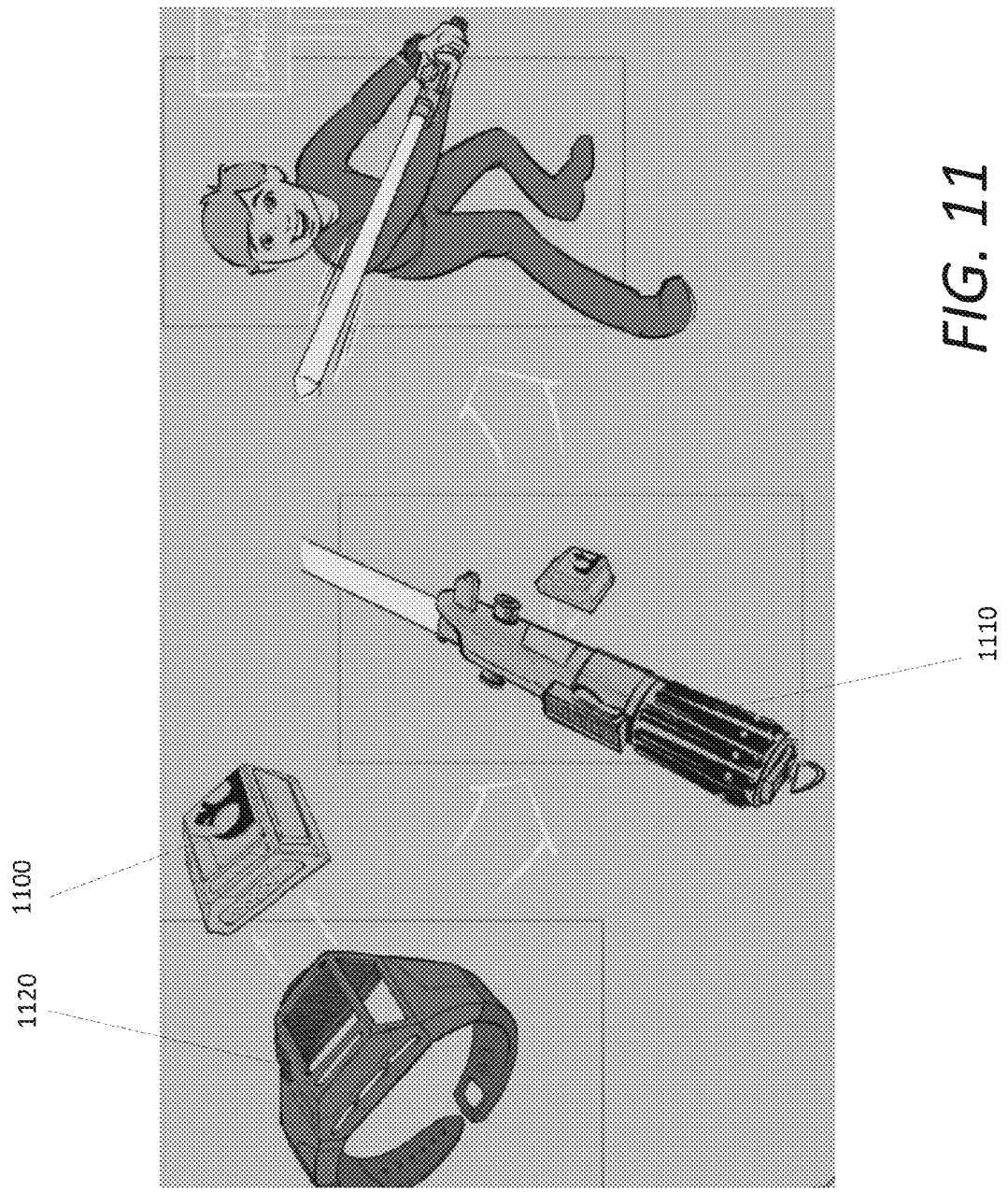
FIG. 11 illustrates an implementation of the modularized sensing device.

FIG. 11 illustrates an implementation of the modularized sensing device 1100. As shown, the sensing device 1100 can be retained by the compatible structure 1120 (e.g., wrist-worn strap), and then removed and placed in an opening of a wand device 1110 (e.g., play sword). The placement of the modular sensing device 1000 in different compatible structures 1120, 1110 for retention and use can be coordinated with different functionality being enabled through the sensing device. For example, the modular sensing device 1100 in the wrist-worn strap 1120 can be used in conjunction with a first program running on a mobile computing device (controller), self-propelled device and/or other computer system (e.g., virtual gaming system). When placed in the wand 1110, the modular sensing device 1100 can be operated in conjunction with a mobile computing device, self-propelled device and/or other computer system (e.g., virtual gaming system) which executes a second program or application. In each context, the orientation of the modular sensing device 1100 can be used to determine a perspective, such as a virtual field of view for gameplay. The perspective can refer to the orientation, direction and/or position of the user, and/or of the user's body part with respect to the sensing device. With the wand, the orientation and direction of the sensing device can be used to project a corresponding virtual object in a virtual environment (e.g., sword). The modular sensing device 1100 may also be able to read an identifier of the compatible structure 1120, 1110 in order to determine information about the structure, such as its dimension, and whether the structure is worn or carried. Based on known information, inferences can be determined for purpose of virtualization, etc. (e.g., length of sword).

CONCLUSION

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that this disclosure is not limited to those precise examples. As such, many modifications and variations will be apparent to practitioners skilled in this art. Accordingly, it is intended that the scope of this disclosure be defined by the following claims and their equivalents.

Furthermore, it is contemplated that a particular feature described either individually or as part of an example can be combined with other individually described features, or parts of other examples, even if the other features and examples make no mentioned of the particular feature. Thus, the absence of describing combinations should not preclude the inventor from claiming rights to such combinations.

What is claimed is:

1. A method of operating a smart home device, the method being performed by a modular sensing device comprising:
   initiating a control mode from a plurality of modes on the modular sensing device, the control mode configured to determine a manner in which user gestures are interpreted, wherein initiating the control mode comprises at least one of:
      upon detecting an inductive pairing between the modular sensing device and the smart home device, automatically initiating the control mode in response to the inductive pairing; and
      upon detecting execution of an application associated with the smart home device, automatically initiating the control mode in response to the execution of the application;
   based on initiating the control mode, establishing a connection with the smart home device;
   receiving sensor data, via an inertial measurement unit of the modular sensing device, corresponding to the user gestures;
   translating the sensor data into a corresponding control command, the corresponding control command being executable to control the smart home device in accordance with the user gesture; and
   transmitting the control command to the smart home device.

2. The method of claim 1, wherein establishing the connection with the smart home device comprises establishing a relayed connection with the smart home device through the computing device in response to the execution of the application.

3. The method of claim 2, wherein the control command is transmitted to the smart home device via the relayed connection through the computing device executing the application, the application configured to control the smart home device.

4. The method of claim 1, wherein the smart home device comprises a home device operable by wireless signals, including at least one of a home appliance, temperature system, lighting system, or an audio system.

5. The method of claim 1, wherein the control command is transmitted directly to the smart home device.

6. The method of claim 1, wherein the control command is operable to control at least one adjustable parameter on the smart home device.

7. A modular sensing device comprising:
   an inertial measurement unit to generate sensor data corresponding to user gestures performed by a user;
   a wireless communication module to establish a communication link with a smart home device;
   a mode selector to select a control mode from a plurality of modes on the modular sensing device, the control mode to configure a manner in which the user gestures are interpreted, wherein selecting the control mode comprises at least one of:
      upon detecting an inductive pairing between the modular sensing device and the smart home device, automatically initiating the control mode in response to the inductive pairing; and
      upon detecting execution of an application associated with the smart home device, automatically initiating the control mode in response to the execution of the application; and
   a controller to execute the control mode causing the controller to:
      translate the sensor data to generate control commands based on the user gestures, the control commands being executable to operate the smart home device; and
      transmit the control commands to the smart home device over the communication link.

8. The modular sensing device of claim 7, wherein the control commands are operable to control at least one adjustable parameter on the smart home device.

9. The modular sensing device of claim 7, further comprising:
   an inductive interface;
   wherein the control mode further causes the controller to:
      detect, via the inductive interface, an inductive pairing between the modular sensing device and the smart home device;
      wherein the wireless communication module establishes the communication link with the smart home device in response to the inductive pairing.

10. The modular sensing device of claim 7, wherein the wireless communication module comprises a BLUETOOTH low energy module.

11. The modular sensing device of claim 7, wherein the wireless communication module establishes the communication link with the smart home device in response to the user initiating an execution of an application associated with the smart home device on a computing device, and wherein the controller establishes the communication link with the smart home device by establishing a relayed connection with the smart home device through the computing device in response to the execution of the application.

12. The modular sensing device of claim 11, wherein the control commands are transmitted to the smart home device via the relayed connection with the computing device executing the application, the application configured to control the smart home device.

13. The modular sensing device of claim 7, wherein the controller transmits the control commands directly to the smart home device via the communication link.

14. The modular sensing device of claim 7, wherein the controller implements a plurality of state machines, each respective state machine being associated with a corresponding user gesture that, when performed by the user, causes a state transition by the respective state machine, and wherein the state transition of the respective state machine causes the modular sensing device to generate a corresponding control command, executable to operate the smart home device, based on the corresponding user gesture.

15. A non-transitory computer-readable medium storing instructions for operating a smart home device with a modular sensing device, wherein the instructions, when executed by one or more processors of the modular sensing device, cause the one or more processors to:
   initiate a control mode from a plurality of modes on the modular sensing device, the control mode configured to determine a manner in which user gestures are interpreted, wherein initiating the control mode comprises at least one of:
      upon detecting an inductive pairing between the modular sensing device and the smart home device, automatically initiating the control mode in response to the inductive pairing; and upon detecting execution of an application associated with the smart home device, automatically initiating the control mode in response to the execution of the application;

based on initiating the control mode, establishing a connection with the smart home device;

receiving sensor data, via an inertial measurement unit of the modular sensing device, corresponding to the user gestures;

translating the sensor data into a corresponding control command, the corresponding control command being executable to control the smart home device in accordance with the user gesture; and transmitting the control command to the smart home device.

16. The non-transitory computer-readable medium of claim 15, wherein the smart home device comprises a home device operable by wireless signals, including at least one of a home appliance, temperature system, lighting system, or an audio system.

17. The non-transitory computer-readable medium of claim 15, wherein establishing the connection with the smart home device comprises establishing a relayed connection with the smart home device through the computing device in response to the execution of the application.

18. The non-transitory computer-readable medium of claim 17, wherein the control command is transmitted to the smart home device via the relayed connection through the computing device executing the application, the application configured to control the smart home device.

19. The non-transitory computer-readable medium of claim 15, wherein the control command is transmitted directly to the smart home device.

20. The non-transitory computer-readable medium of claim 15, wherein the control command is operable to control at least one adjustable parameter on the smart home device.

* * * * *